United States Patent (10) Patent No.: US 10,569,359 B2
Renz et al. (45) Date of Patent: Feb. 25, 2020

(54) METHOD FOR CUTTING OUT A SECTION OF A WORKPIECE USING A LASER BEAM, AND AN ASSOCIATED LASER CUTTING MACHINE

(71) Applicant: TRUMPF Werkzeugmaschinen GmbH + Co. KG, Ditzingen (DE)

(72) Inventors: Bernd Hermann Renz, Marbach am Neckar (DE); Frank Schmauder, Metzingen (DE); Dieter Pfisterer, Tamm (DE); Jochen Bellon, Renningen (DE); Harald Mathias, Boennigheim (DE)

(73) Assignee: TRUMPF Werkseugmaschinen GmbH + Co. KG, Ditzingen (DE)

( * ) Notice: Subject to any disclaimer, the term of this patent is extended or adjusted under 35 U.S.C. 154(b) by 587 days.

(21) Appl. No.: 15/292,579

(22) Filed: Oct. 13, 2016

(65) Prior Publication Data

US 2017/0028508 A1 Feb. 2, 2017

Related U.S. Application Data

(63) Continuation of application No. PCT/EP2015/057936, filed on Apr. 13, 2015.

(30) Foreign Application Priority Data

Apr. 15, 2014 (DE) ........................ 10 2014 207 170

(51) Int. Cl.
*B23K 26/08* (2014.01)
*B23K 26/38* (2014.01)
(52) U.S. Cl.
CPC ...... *B23K 26/0876* (2013.01); *B23K 26/0853* (2013.01); *B23K 26/38* (2013.01)

(58) Field of Classification Search
CPC . B23K 26/0876; B23K 26/0853; B23K 26/38
(Continued)

(56) References Cited

U.S. PATENT DOCUMENTS 5,574,348 A 11/1996 Ehlerding
5,751,585 A * 5/1998 Cutler ................. B23K 26/083
318/571

(Continued)

FOREIGN PATENT DOCUMENTS

CN 1213440 4/1999
CN 102015191 4/2011
(Continued)

OTHER PUBLICATIONS

International Search Report for corresponding PCT Application No. PCT/EP2015/057936, dated Aug. 28, 2015, 4 pages.
(Continued)

*Primary Examiner* — Thien S Tran
(74) *Attorney, Agent, or Firm* — Fish & Richardson P.C.

(57) ABSTRACT

This disclosure relates to methods and apparatuses for cutting out a workpiece section along a target path from a plate-shaped workpiece using a laser beam of a laser cutting machine having a first drive for moving the workpiece along a first drive axis, a second drive for moving a laser cutting head along the first drive axis. Target values of the target path of the laser beam are divided into target values for the first drive and for the second drive. Before the laser beam reaches a cutting-out end position of the workpiece section, the target values for the first drive are set to a constant value, so that after braking of the first drive, the cutting out of the workpiece section is only still executed by moving the laser cutting head and the workpiece comes to a stop at latest at the cutting-out end position.

8 Claims, 5 Drawing Sheets

(58) Field of Classification Search
USPC ............ 219/121.63, 121.71, 121.78, 121.82, 219/121.83
See application file for complete search history.

(56) References Cited

U.S. PATENT DOCUMENTS

| | | |
|---|---|---|
| 5,798,927 A | 8/1998 | Cutler et al. |
| 6,982,536 B2 | 1/2006 | Geissdorfer et al. |
| 2013/0126491 A1* | 5/2013 | Veit .................... B23K 26/0853 219/121.82 |

FOREIGN PATENT DOCUMENTS

| | | |
|---|---|---|
| CN | 102066036 | 5/2011 |
| CN | 102574240 | 8/2015 |
| DE | 4123323 A1 | 1/1993 |
| DE | 10355614 A1 | 7/2005 |
| DE | 102011088673 A1 | 6/2013 |
| WO | WO2011026486 A1 | 3/2011 |
| WO | WO2011131507 A1 | 10/2011 |

OTHER PUBLICATIONS

Office Action in Chinese Application No. 201580019825.0, dated Sep. 4, 2017, 28 pages (with English translation).

\* cited by examiner

METHOD FOR CUTTING OUT A SECTION OF A WORKPIECE USING A LASER BEAM, AND AN ASSOCIATED LASER CUTTING MACHINE

CROSS-REFERENCE TO RELATED APPLICATIONS

This application is a continuation of and claims priority under 35 U.S.C. § 120 to PCT Application No. PCT/EP2015/057936 filed on Apr. 13, 2015, which claims priority to German Application No. DE 10 2014 207 170.4, filed on Apr. 15, 2014. The entire contents of these priority applications are incorporated herein by reference.

TECHNICAL FIELD

The present invention relates to methods and apparatuses for cutting out a workpiece section along a target path from a plate-shaped workpiece using a laser beam of a laser cutting machine.

BACKGROUND

In machines having components moving along redundant axes, a target position of a tool can be reached by various combinations of the movements along the redundant axes. For example, one machine component can be the sluggish (heavy) coarse axis component, having a large range of motion along the axis for movement over the workpiece (in the order of magnitude of meters) and another component, which can be highly accelerated, can be the (light) fine axis component having a small range of motion (in the order of magnitude of several centimeters to a few tens of centimeters) over the same axis. Movement in the components along the axis in concert can allow rapid travel down fine contours. In sheet mover laser cutting machines, in which both the workpiece and also the laser processing head are moved along redundant axes, the component for movement of the sheet acts as the coarse axis component and the component for movement of the laser head acts as the fine axis component.

German Patent Publication DE 103 55 614 A1 discloses filtering a target path using a low-pass filter and supplying the filtered target path to the coarse axis component to obtain target positions along the axis for each component so that the combined motion of the components produces the target path of laser processing. The difference between the filtered target path and the actual target path results in the target path for the fine axis component. The target values, which are strongly smoothed by the low-pass filter, are thus supplied to the less dynamic coarse axis component, and the difference between the smoothed target values of the coarse axis component and the target values of the axis pair are supplied to the more dynamic fine axis component. The target path is supplied to the system only after a delay to minimize the range of motion of the fine axis component, which enables higher accelerations for this component along the axis. The target path of the coarse axis component is thus closer to the target path of the overall system.

As a result of the properties of path division methods, in machines having redundant axes, the individual axes of the redundant axis pair also continue to run when the superimposed movement of the redundant axes is already completed. The two axes of the axis pair move in opposite directions in this case. In sheet mover laser cutting machines, however, this property permits the remaining sheet to continue moving when the workpiece section has already been cut out. The risk of overlapping or entangling thus exists between the cut-out workpiece section and the remaining sheet. One approach to deal with this issue is to stop the redundant axes in a timely manner before the cutting-out end position and then, with a stationary sheet, only execute the severing cut of the last contour section, the so-called "final cut," using the fine axis. However, this procedure consumes a relatively large amount of time.

SUMMARY

Various embodiments disclosed herein provide methods and apparatuses for cutting out a workpiece section along a target path, to safely and reliably avoid the overlapping or entangling of cut-out workpiece sections with the remaining workpiece, i.e., to increase the process reliability during the outward transfer of cut-out workpiece sections, and to provide an associated laser cutting machine.

Certain embodiments provide methods for cutting out a workpiece section along a target path from a plate-shaped workpiece using a laser beam of a laser cutting machine configured to emit a laser beam for cutting. The methods include determining, via at least one controller, first target values, $X_G$, corresponding to positions of a workpiece and second target values, $X_S$, corresponding to positions of a laser cutting head configured to emit the laser beam to align the laser beam onto the workpiece as a first drive moves the workpiece along a first drive axis and as a second drive configured to align the laser beam onto the workpiece contemporaneously moves the laser cutting head along the first drive axis as the first drive moves the workpiece so at to cause the laser beam to traverse the target path along the workpiece. The methods further include causing, the first drive to drive the workpiece to move, along at least a portion of the first target values, $X_G$. The methods also include causing the second drive to drive the laser cutting head to move along at least a portion of the second target values, $X_S$. The methods include setting the first target values $X_G$ to a constant drive axis target value via the at least one controller from a point in time before the laser beam reaches a cutting-out end position of the workpiece section and by at least a braking time of the first drive to bring the workpiece to a stop, so that after the braking of the first drive, the cutting out of the workpiece section is only still executed by the second drive continuing to drive the laser cutting head and the workpiece comes to a stop at latest at the cutting-out end position.

According to the invention, the coarse axis is supplied a constant target value shortly before the cutting-out end position, so that the coarse axis and therefore the workpiece come to a stop and only the fine axis still moves during the cutting out of the workpiece section. The switchover point in time can be selected such that the workpiece comes to a standstill precisely at the moment at which the laser beam reaches the cutting-out end position. Due to the flying introduction of the final cut without prior stopping of the redundant axes, time is saved during each severing cut.

In certain implementations, low-frequency drive axis target values are filtered out of the drive axis target values using a low-pass filter and high-frequency drive axis target values are ascertained as the difference between the original drive axis target values and the low-frequency drive axis target values. This final cut initiated in a flying manner may be implemented particularly simply using a switch function, which stops the coarse axis at latest at the position at which the final cut begins. The drive axis target values for the first drive are switched to a constant drive axis target value by a switch arranged before the low-pass filter from the point in time before the cutting-out end position of the workpiece section by at least the braking time of the first drive, in accordance with particular implementations.

In various implementations that achieve a path division using a low-pass filter, a differentiation is made between a path division with and without delayed path execution. In the case of a path division in which the high-frequency drive axis target values are ascertained as the difference between the non-time-delayed original drive axis target values and the low-frequency drive axis target values, the switchover point in time is before the cutting-out end position of the workpiece section by at least two times the group delay of the low-pass filter.

In certain implementations where a path division in which the high-frequency drive axis target values are ascertained as the difference between the time-delayed original drive axis target values and the low-frequency drive axis target values, the switchover point in time is before the cutting-out end position of the workpiece section by at least one group delay of the low-pass filter.

In another general aspect, the invention also relates to a laser cutting machine for laser cutting of workpiece sections along a target path from a plate-shaped workpiece using a laser beam having a first drive for moving the workpiece at least along a first drive axis and a second drive for moving a laser cutting head, which aligns the laser beam onto the workpiece, at least along the first drive axis, and having a control device for movement division of drive axis target values of the target path of the laser beam into low-frequency drive axis target values of the first drive and high-frequency drive axis target values of the second drive, wherein the control device ascertains the high-frequency drive axis target values as the difference between the original drive axis target values and the low-frequency drive axis target values and, according to the invention, has an activatable transfer device, which transfers the drive axis target values for the first drive to a constant drive axis target value.

In certain implementations, the control device has a low-pass filter implemented, for example, as a linear-phase FIR filter, which filters the low-frequency drive axis target values out of the supplied drive axis target values, and a subtraction unit, which ascertains the high-frequency drive axis target values as the difference between the original drive axis target values and the low-frequency drive axis target values, and an activatable switch upstream of the low-pass filter as the transfer device, which in its one switch position relays the supplied drive axis target values and in its other switch position relays a constant drive axis target value to the low-pass filter. The switch is activated in a timely manner before the cutting-out end position by the machine control of the laser cutting machine, for example.

To implement a flying final cut, according to certain implementations, a switch is introduced upstream the low-pass filter, which is flipped when the target value of the redundant axis pair has reached the position at which the final cut begins. With a flipped switch, the target position of the coarse axis is kept constant at the input of the low-pass filter, so that the coarse axis and therefore the workpiece come to a stop and only the fine axis still moves during the cutting out of the workpiece section. The supplied drive axis target values for the execution of the final cut are interpolated further by the machine control without interruption, but only used for the calculation of the target values of the fine axis. The length of the final cut has to be dimensioned in this case so that it is within the range of the fine axis.

In particular implementations where the path division uses a low-pass filter, a differentiation is made between path division with and without delayed path execution, wherein the implementation according to the invention of a final cut introduced in a flying manner functions in the same manner in both variants. If a linear-phase FIR filter is used as the low-pass filter, as a result of its properties, it thus lasts exactly two group delays of the filter from the point in time of flipping the switch until the coarse axis comes to a standstill. The soft braking of the coarse axis is automatically ensured in this case without complex auxiliary algorithms by the path division filter.

The device can have a delay unit upstream of the subtraction unit, which chronologically delays the supplied drive axis target values by at least the group delay of the low-pass filter. If a linear-phase FIR filter is used as the low-pass filter, as a result of its properties, it thus lasts exactly one group delay of the filter from the point in time of flipping the switch until the coarse axis comes to a standstill. The soft braking of the coarse axis is automatically ensured in this case without complex auxiliary algorithms by the path division filter.

In certain implementations, the first drive is designed for moving the workpiece along two drive axes perpendicular to one another and the second drive is designed for moving the laser cutting head along the two drive axes. In this case, the device can have, for each of the two drive axes, a low-pass filter and a subtraction unit for the movement division of the drive axis target values of the target path into low-frequency drive axis target values of the coarse axes and high-frequency drive axis target values of the fine axes and an activatable switch upstream of the low-pass filter, which in one switch position relays the supplied drive axis target values and in another switch position relays a constant drive axis target value to the low-pass filter. The switches are activated, for example, by the machine control of the laser cutting machine in a timely manner before the cutting-out end position.

Further, particular embodiments of the invention also relate to a device for movement division of drive axis target values of the target path of a laser beam into low-frequency drive axis target values of a first drive and high-frequency drive axis target values of a second drive. The device has a low-pass filter, which filters the low-frequency drive axis target values out of the supplied drive axis target values, and has a subtraction unit, which ascertains the high-frequency drive axis target values as the difference between the original drive axis target values and the low-frequency drive axis target values. According to the invention, an activatable switch is upstream of the low-pass filter, which in its one switch position relays the supplied drive axis target values to the low-pass filter and in its other switch position relays a constant drive axis target value to the low-pass filter.

Finally, particular embodiments of the invention also relates to a method for cutting out a workpiece section along a target path from a plate-shaped workpiece using a laser beam of a laser cutting machine, which has a first drive for moving the workpiece at least along a first drive axis, a second drive for moving a laser cutting head, which aligns the laser beam onto the workpiece, at least along the first drive axis, wherein drive axis target values of the target path of the laser beam are divided into drive axis target values for the first drive and drive axis target values for the second drive, and wherein from a point in time which is before the cutting-out end position of the workpiece section by at least the braking time of the first drive, the drive axis target values for the first drive are transferred to a constant drive axis target value, so that after the braking of the first drive, the cutting out of the workpiece section is only still executed by moving the laser cutting head and the workpiece comes to a stop at latest at the cutting-out end position.

Further advantages of the invention are prescribed by embodiments described in further detail in the description and the drawings. The above-mentioned features and the features specified hereafter can also each be used per se or in multiples in any arbitrary combinations. The embodiments that are shown and described are not to be understood as an exhaustive list, but rather have exemplary character for the description of the invention.

DETAILED DESCRIPTION

In the following description of the figures, identical reference signs are used for identical or functionally identical components.

Figure 1:
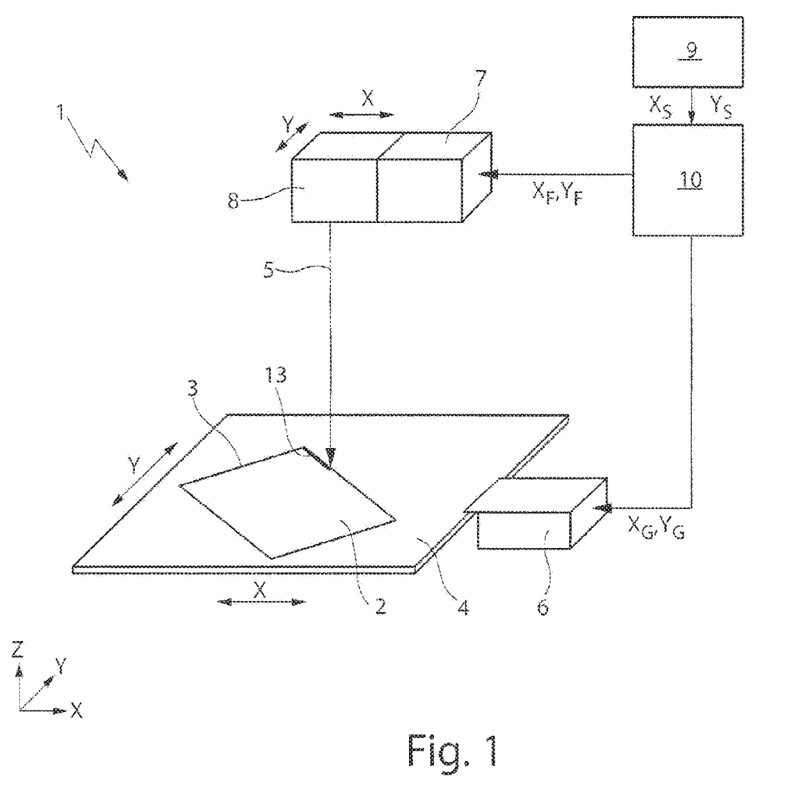
FIG. 1 shows a laser cutting machine having a workpiece movable along the X and Y axes, a laser cutting head movable along the X and Y axes, and a device for path division of the target path of the laser beam into a movement along the workpiece axes and a movement along the laser cutting head axes.

The laser cutting machine 1 shown in FIG. 1 is used for the laser cutting of workpiece sections 2 along a target path 3 from a plate-shaped workpiece (for example, sheet) 4 using a laser beam 5. The laser cutting machine 1 comprises a first XY drive ("workpiece drive") 6 for moving the workpiece 4 in the XY plane along the X and Y axes, a second XY drive ("laser cutting head drive") 7 for moving a laser cutting head 8, which aligns the laser beam 5 on the workpiece 4, along the X and Y axes, and a machine controller 9, which supplies the target values $X_S$, $Y_S$ for the target path of the laser beam 5 on the workpiece 4. The laser cutting machine 1 additionally has a device 10 for the movement division of the drive axis target values $X_S$, $Y_S$ of the target path 3 of the laser beam 5 into low-frequency drive axis target values $X_G$, $Y_G$ for the workpiece drive 6 and high-frequency drive axis target values $X_F$, $Y_F$ for the laser cutting head drive 7.

Figure 2A:
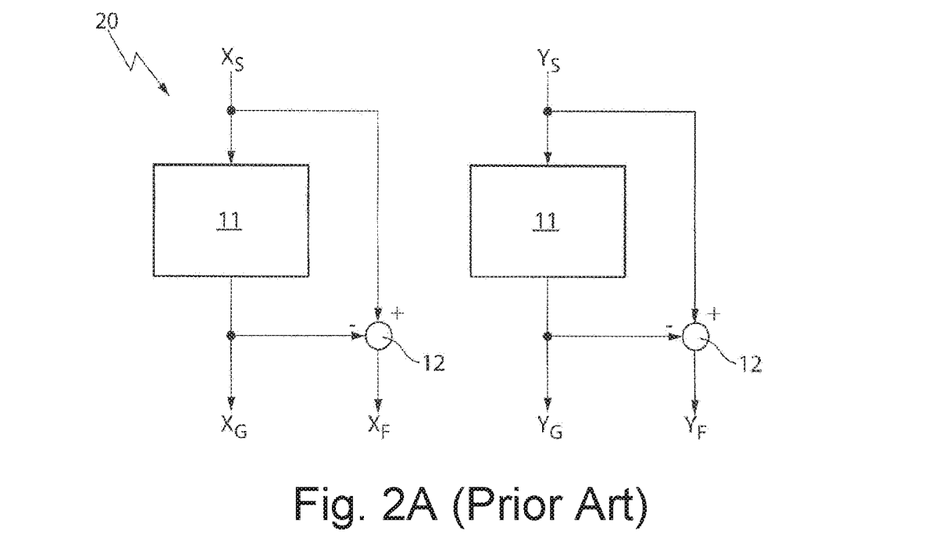
FIG. 2A and FIG. 2B show a known path division device having a low-pass filter without time delay (FIG. 2A) and an associated path division (FIG. 2B) along the Y axis during the laser cutting of a square workpiece section.

FIG. 2A shows a known path division device 20 having a low-pass filter 11 without time delay and a subtraction unit 12 for each of the two drive axes X, Y. The low-pass filters 11 are linear-phase FIR filters having constant group delay and filter in each case the low-frequency drive axis target values $X_G$, $Y_G$ out of the supplied drive axis target values $X_S$, $Y_S$ and relay them to the workpiece drive 6. The subtraction units 12 ascertain the high-frequency drive axis target values $X_F$, $Y_F$ as the difference between the supplied drive axis target values $X_S$, $Y_S$ and the filtered drive axis target values $X_G$, $Y_G$ and relay them to the laser processing head drive 7. The low-frequency drive axis target values $X_G$, $Y_G$, which are strongly smoothed by the low-pass filters 11, are thus supplied to the less dynamic coarse axes of the workpiece drive 6, and the difference between the original drive axis target values $X_S$, $Y_S$ and the smoothed drive axis target values $X_G$, $Y_G$ of the coarse axis are supplied to the more dynamic fine axes of the laser cutting head drive 7.

Figure 2B:
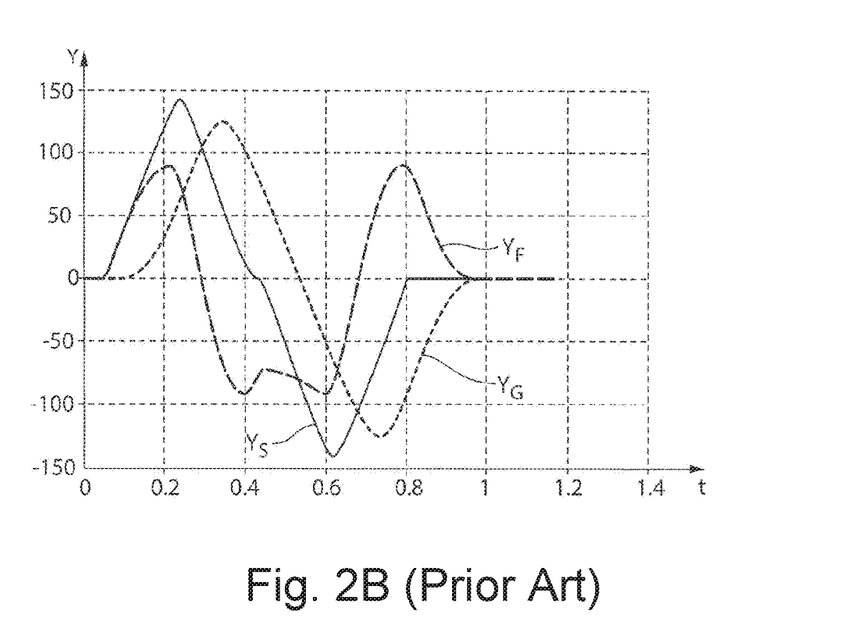

FIG. 2B shows the time curve of the associated path division during the laser cutting of a square workpiece section 2 along the Y axis, i.e., the time curve of the supplied drive axis target values $Y_S$ (solid line), the drive axis target values $Y_G$ for the coarse axis (fine dashed line) and the drive axis target values $Y_F$ for the fine axis (dashed line). As a result of the properties of the path division, the coarse and fine axes also still run in opposite directions when the superimposed movement of the redundant coarse and fine axes is already completed. The remaining sheet thus still moves when the workpiece section 2 is already cut out. The risk of overlapping or entangling between the workpiece section 2 and the remaining sheet thus exists.

Figure 3A:
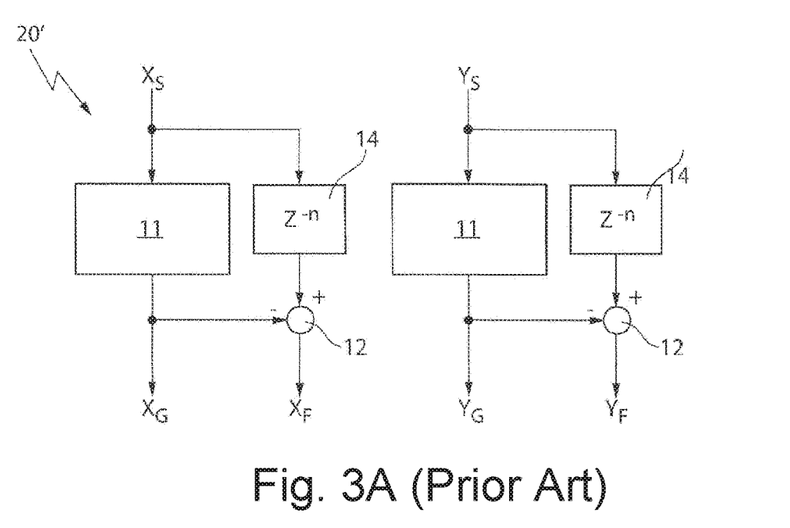
FIG. 3A and FIG. 3B show a known path division device having a low-pass filter with time delay (FIG. 3A) and an associated path division (FIG. 3B) along the Y axis during the laser cutting of a square workpiece section.

The known path division device 20' shown in FIG. 3A differs from the path division device 20 only in that the drive axis target values $X_S$, $Y_S$ are supplied with a time delay to the subtraction units 12 using delay units 14 here. Thus, on the one hand, the target path of the coarse axis is closer to the target path of the overall system and, on the other hand, the range of motion of the fine axis required for the method is minimized, which enables higher accelerations for this axis.

Figure 3B:
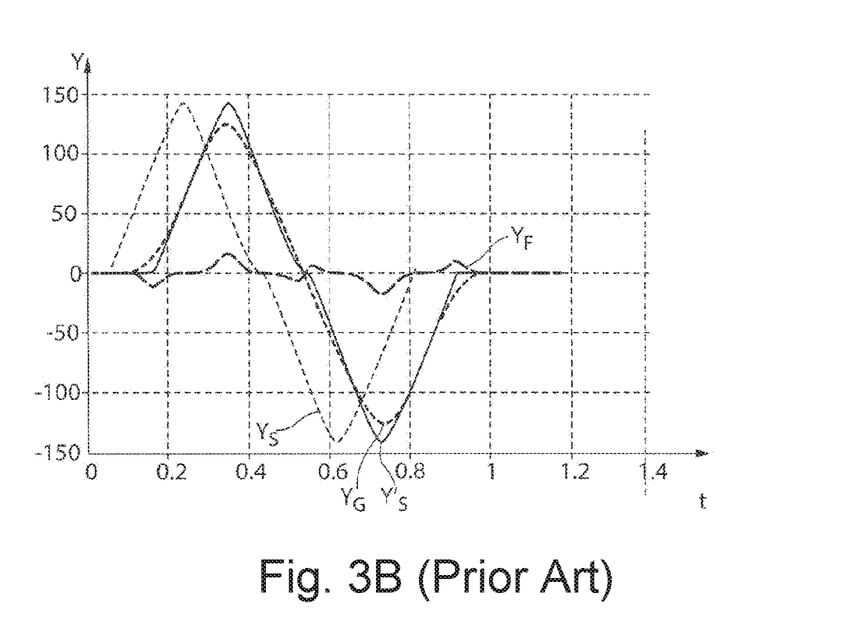

FIG. 3B shows the time curve of the associated path division during the laser cutting of a square workpiece section 2 along the Y axis, i.e., the time curve of the supplied drive axis target values $Y_S$ (fine dashed line), the delayed drive axis target values $Y_S'$ (solid line), the drive axis target values $Y_G$ for the coarse axis (dashed line) and the drive axis target values $Y_F$ for the fine axis (broken line). The coarse and fine axes also still run in opposite directions here when the superimposed movement of the redundant coarse and fine axes is already completed.

Figure 4A:
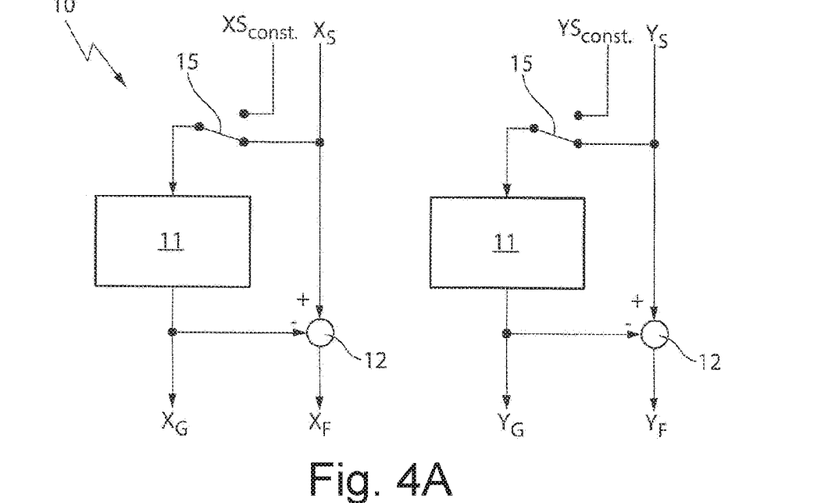
FIG. 4A and FIG. 4B show a path division device according to the invention having a low-pass filter without time delay (FIG. 4A) and an associated path division (FIG. 4B) along the Y axis during the laser cutting of a square workpiece section.

The path division device 10 according to the invention shown in FIG. 4A differs from the path division device 20 in that a switch 15, which is activated by the machine control 9, is arranged upstream of each of the low-pass filters 11. The switches 15 relay in their one switch position the supplied drive axis target values $X_S$, $Y_S$ and in their other switch position a constant drive axis target value $X_{Sconst}$, $Y_{Sconst}$ to the respective low-pass filters 11.

Figure 4B:
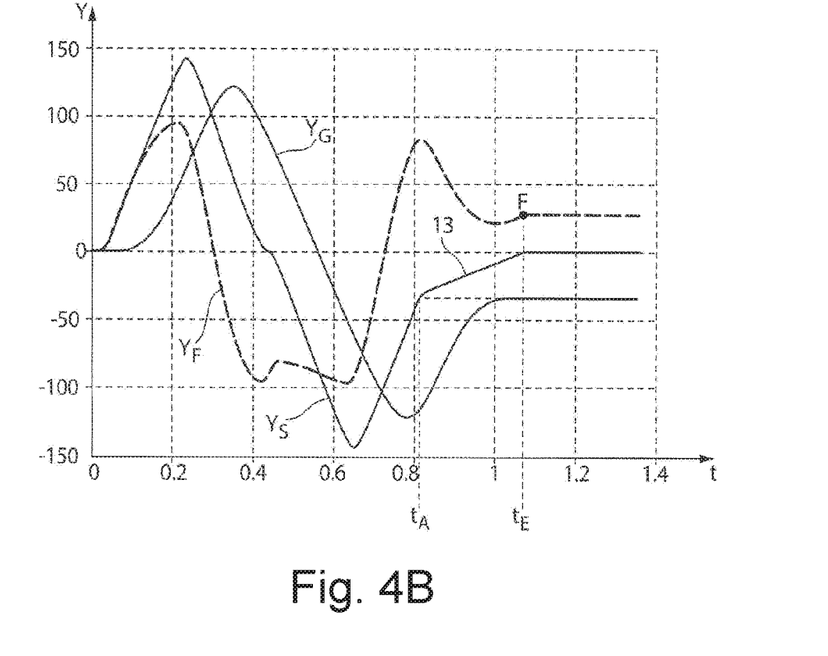

FIG. 4B shows the associated path division during the laser cutting of a square workpiece section 2 along the Y axis, i.e., the time curve of the supplied drive axis target values $Y_S$ (solid line), the drive axis target values $Y_G$ for the coarse axis (solid line), and the drive axis target values $Y_F$ for the fine axis (dashed line). At the point in time $t_4$, which is before the cutting-out end position F of the workpiece section 2 by the braking time of the coarse axis, the final cut 13 of the workpiece section 2, i.e., the severing cut of the last contour section for cutting out the workpiece section 2 from the workpiece 4, is initiated by switching over the switch 15 to the constant drive axis target values $X_{Sconst}$, $Y_{Sconst}$.

With flipped switch 15, this target position is kept constant ("frozen") at the input of the low-pass filter 11, i.e., the coarse axis is stopped at the position at which the final cut 13 begins. The target values for the execution of the final cut 13 are further interpolated by the machine control 9 without interruption and used for the calculation of the target values of the fine axis. From the point in time $t_A$, the cutting out of the workpiece section 2 is increasingly performed by moving the fine axis or the laser cutting head 8, while the coarse axis or the workpiece 4 decelerate and come to a standstill precisely at the point in time $t_E$ at which the final cut 13 reaches the cutting-out end position F. The length of the final cut 13 has to be dimensioned in this case so that it is within the range of the fine axis. As a result of the properties of the linear-phase FIR low-pass filter 11 used, it lasts exactly two group delays of the low-pass filter 11 from the point in time of flipping the switch 15 until the coarse axis comes to a standstill. In the case of this path division without time-delayed path execution, the braking time for the execution of the final cut 13 therefore has to be at least two group delays. The soft braking of the coarse axis is ensured automatically in this case without complex auxiliary algorithms by the low-pass filter 11.

Figure 5A:
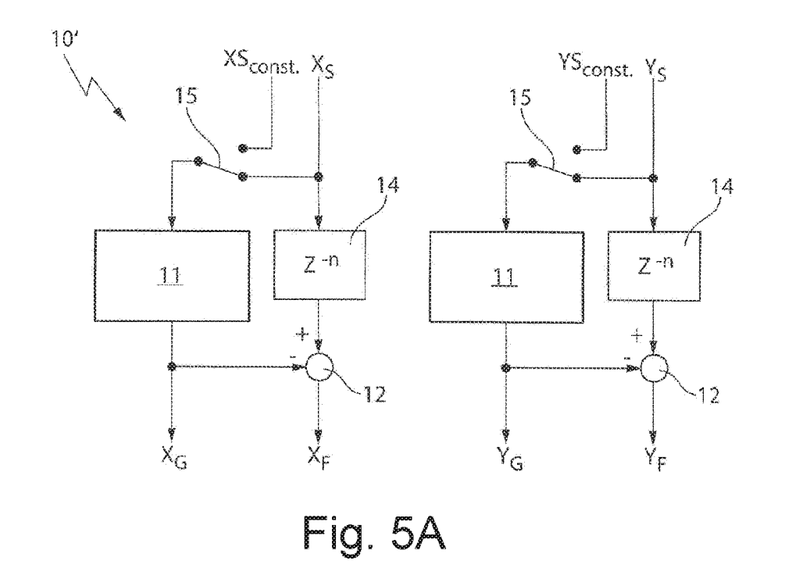
FIG. 5A and FIG. 5B show a path division device according to the invention having a low-pass filter with time delay (FIG. 5A) and an associated path division (FIG. 5B) along the Y axis during the laser cutting of a square workpiece section.

The path division device 10' according to the invention shown in FIG. 5A differs from the path division device 10 in that the drive axis target values $X_S$, $Y_S$ are supplied with a time delay to the subtraction units 12 using delay units 14.

Figure 5B:
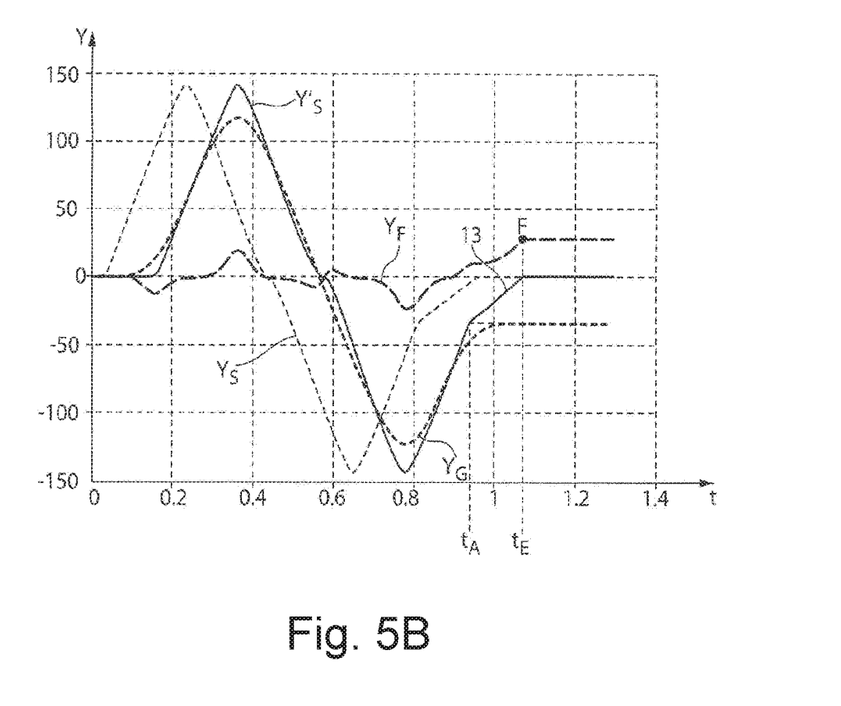

FIG. 5B shows the associated path division during the laser cutting of a square workpiece section 2 along the Y axis, i.e., the time curve of the supplied drive axis target values $Y_S$ (light dashed line), the delayed drive axis target values $Y_{S'}$ (solid line), the drive axis target values $Y_G$ for the coarse axis (dark dashed line) and the drive axis target values $Y_F$ for the fine axis (broken line). At the point in time $t_A$, which is before the cutting-out end position F of the workpiece section 2 by the braking time of the coarse axis, the final cut 13 is initiated by switching over the switch 15 to the constant drive axis target values $X_{Gconst}$, $Y_{Gconst}$, so that the cutting out of the workpiece section 2 is only still performed by moving the fine axis or the laser cutting head 8 and the coarse axis or the workpiece 4 come to a standstill precisely at the point in time $t_E$ at which the final cut 13 reaches the cutting-out end position F. In the case of this path division, in which the path is executed with a time delay by a group delay, the braking time for the execution of the final cut 13 has to be at least one group delay.

The switches 15 for switching over the target values can be implemented in the same manner in the machine control 9 as the low-pass filters 11 for the path division. The information about when the switches 15 have to be flipped and how strongly the velocity has to be reduced during the final cut 13 can advantageously be calculated via a user interface (Numeric Control Kernel-Original Equipment Manufacturer interface ("NCK-OEM interface") or via suitable synchronous actions, which are incorporated at a corresponding point in the NC program of the workpiece processing.

At the point in time $t_A$, at which the target values of the coarse axes are frozen, offset values $X_{Soffset}$, $Y_{Soffset}$ can optionally additionally also be added to the target values. The location of the cut-out workpiece section 2 in relation to the cutting matrix during the cutting out can be manipulated by these offset values. The adding is performed—like the freezing of the drive axis target values $X_S$, $Y_S$—in a "hard" manner. After the final cut 13, the offset values are retracted again when switching on the coarse axes using the switches 15.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for cutting out a workpiece section along a target path from a plate-shaped workpiece using a laser beam of a laser cutting machine, the method comprising:
   determining, via at least one controller, first target values $X_G$, corresponding to positions of a workpiece and second target values $X_S$, corresponding to positions of a laser cutting head configured to emit a laser beam, to align the laser beam onto the workpiece as a first drive moves the workpiece along a first drive axis and as a second drive configured to align the laser beam onto the workpiece contemporaneously moves the laser cutting head along the first drive axis to cause the laser beam to traverse the target path along the workpiece;
   causing the first drive to drive the workpiece to move along at least a portion of the first target values $X_G$;
   causing the second drive to drive the laser cutting head to move along at least a portion of the second target values $X_S$;
   setting the first target values $X_G$ to a constant drive axis target value via the at least one controller from a point in time before the laser beam reaches a cutting-out end position (F) of the workpiece section and by at least a braking time of the first drive to bring the workpiece to a stop, so that after the braking time of the first drive, the cutting out of the workpiece section is only still executed by the second drive continuing to drive the laser cutting head and the workpiece comes to a stop at latest at the cutting-out end position (F);
   filtering low-frequency drive axis target values $X_G$ out of the second target values $X_S$ using a low-pass filter and ascertaining high-frequency drive axis target values $X_F$ as a difference between the second drive axis target values $X_S$ and the low-frequency drive axis target values $X_G$; and
   ascertaining the high-frequency drive axis target values XF in a case of a path division as a difference between a non-time-delayed version of the second target values XS and the low-frequency drive axis target values XG, and wherein a switchover point in time is before the laser beam reaches the cutting-out end position (F) of the workpiece section by at least two times a group delay of the low-pass filter.

2. The method of claim 1, wherein the first target values $X_G$ are set to the constant drive axis target value at a switchover point in time selected such that the workpiece comes to a standstill contemporaneously with the laser beam reaching the cutting-out end position (F).

3. The method of claim 1, wherein the first drive axis target values $X_G$ for the first drive are switched to a constant drive axis target value $X_{Sconst}$ by a switch arranged upstream of the low-pass filter from a point in time before the laser beam reaches the cutting-out end position (F) of the workpiece section by at least the braking time of the first drive.

4. A method for cutting out a workpiece section along a target path from a plate-shaped workpiece using a laser beam of a laser cutting machine, the method comprising:
   determining, via at least one controller, first target values $X_G$, corresponding to positions of a workpiece and second target values $X_S$, corresponding to positions of a laser cutting head configured to emit a laser beam, to align the laser beam onto the workpiece as a first drive moves the workpiece along a first drive axis and as a second drive configured to align the laser beam onto the workpiece contemporaneously moves the laser cutting head along the first drive axis to cause the laser beam to traverse the target path along the workpiece;

causing the first drive to drive the workpiece to move along at least a portion of the first target values $X_G$;

causing the second drive to drive the laser cutting head to move along at least a portion of the second target values $X_S$;

setting the first target values $X_G$ to a constant drive axis target value via the at least one controller from a point in time before the laser beam reaches a cutting-out end position (F) of the workpiece section and by at least a braking time of the first drive to bring the workpiece to a stop, so that after the braking time of the first drive, the cutting out of the workpiece section is only still executed by the second drive continuing to drive the laser cutting head and the workpiece comes to a stop at latest at the cutting-out end position (F);

filtering low-frequency drive axis target values $X_G$ out of the second target values $X_S$ using a low-pass filter and ascertaining high-frequency drive axis target values $X_F$ as a difference between the second drive axis target values $X_S$ and the low-frequency drive axis target values $X_G$; and ascertaining the high-frequency drive axis target values $X_F$, in the a of a path division, as a difference between a time-delayed version of the second target values $X_S$ and the low-frequency drive axis target values $X_G$, and wherein the switchover point in time is before the laser beam reaches the cutting-out end position (F) of the workpiece section by at least one group delay of the low-pass filter.

5. A laser cutting machine for cutting out a workpiece section along a target path from a plate-shaped workpiece using a laser beam, the laser cutting machine comprising:

a first drive configured to drive a workpiece for moving the workpiece at least along a first drive axis a second drive configured to drive a laser cutting head for moving the laser cutting head, which aligns the laser beam onto the workpiece at least along the first drive axis; and a control device for movement division of drive axis target values, $X_S$ of the target path of the laser beam into low-frequency drive axis target values $X_G$ of the first drive and high-frequency drive axis target values $X_F$ of the second drive, wherein the device ascertains the high-frequency drive axis target values $X_F$ as a difference between the drive axis target values $X_S$ and the low-frequency drive axis target values $X_G$, wherein the control device comprises an activatable transfer device, configured to set the drive axis target values $X_G$) for the first drive to a constant drive axis target value, wherein the first drive is designed for moving the workpiece along two drive axes (X, Y), perpendicular to one another and wherein the second drive is designed for moving the laser cutting head along the two drive axes (X, Y), and wherein the control device includes, for each of the two drive axes (X, Y), a low-pass filter and a subtraction unit for a movement division of the drive axis target values (XS, YS) of the target path into low-frequency drive axis target values (XG, YG) of the drive axes (X, Y) and high-frequency drive axis target values (XF, YF) of the drive axes (X, Y) and an activatable switch arranged upstream of the low-pass filter, which is configured to in one switch position relay the supplied drive axis target values (XS, YS) and in another switch position relay a constant drive axis target value (XSconst, YSconst) to the low-pass filter.

6. The laser cutting machine of claim 5, wherein the control device comprises:

a low-pass filter configured to filter the low-frequency drive axis target values $X_G$ out of the drive axis target values $X_S$, a subtraction unit configured to ascertain the high-frequency drive axis target values $X_F$ as a difference between the original drive axis target values $X_S$ and the low-frequency drive axis target values $X_G$, and an activatable switch upstream of the low-pass filter as the transfer device configured to in one switch position relay the drive axis target values $X_S$ and in another switch position relay a constant drive axis target value to the low-pass filter.

7. The laser cutting machine of claim 6, wherein the control device further comprises a delay unit upstream of the subtraction unit, wherein the delay unit is configured to chronologically delay the drive axis target values $X_S$ by at least a group delay of the low-pass filter.

8. The laser cutting machine as claimed in claim 5, wherein the control device has delay units upstream of the subtraction units for both drive axes (X, Y), wherein the delay units are configured to chronologically delay the drive axis target values ($X_S$, $Y_S$) by at least a group delay of the low-pass filter.

* * * * *